(12) United States Patent
Knobel

(10) Patent No.: US 8,124,151 B2
(45) Date of Patent: *Feb. 28, 2012

(54) METHOD AND DEVICE FOR THE PRODUCTION OF EDIBLES COMPRISING AN OUTER SHELL

(75) Inventor: Guido Knobel, Felben (CH)

(73) Assignee: KMB Produktions AG, Felben (CH)

( * ) Notice: Subject to any disclaimer, the term of this patent is extended or adjusted under 35 U.S.C. 154(b) by 1085 days.

This patent is subject to a terminal disclaimer.

(21) Appl. No.: 10/514,100

(22) PCT Filed: May 8, 2003

(86) PCT No.: PCT/EP03/04813
§ 371 (c)(1),
(2), (4) Date: Apr. 21, 2005

(87) PCT Pub. No.: WO03/094626
PCT Pub. Date: Nov. 20, 2003

(65) Prior Publication Data
US 2005/0175737 A1     Aug. 11, 2005

(30) Foreign Application Priority Data

May 14, 2002   (DE) .................. 102 21 524

(51) Int. Cl.
*A23P 1/10* (2006.01)
(52) U.S. Cl. ........ 426/280; 426/138; 426/143; 426/389; 426/514
(58) Field of Classification Search .................. 426/389, 426/512, 138, 139, 143, 279, 280, 282–283, 426/515, 518, 514; 425/289, 218, 806, 292, 425/293
See application file for complete search history.

(56) References Cited

U.S. PATENT DOCUMENTS 1,537,993 A * 5/1925 Lewison ....................... 425/292
(Continued)

*Primary Examiner* — Drew E Becker
(74) *Attorney, Agent, or Firm* — Bachman & LaPointe, P.C.

(57) ABSTRACT

A method for producing edibles comprising an outer shell from a mass which is fed into a mold. A tempered male die is dipped into the mold, a process during which an excess amount of the mass overflows an edge of the mold. The excess mass is separated form the shell at the edge of the mold by the male die.

5 Claims, 3 Drawing Sheets

U.S. PATENT DOCUMENTS

| | | | | |
|---|---|---|---|---|
| 1,647,944 A * | 11/1927 | Villasenor | 425/216 |
| 2,233,295 A * | 2/1941 | Miller | 425/292 |
| 2,691,337 A * | 10/1954 | Forrest | 425/470 |
| 2,733,494 A * | 2/1956 | Bryer et al. | 425/84 |
| RE24,299 E * | 4/1957 | Pasquale | 107/54 |
| 2,797,653 A * | 7/1957 | Rade | 425/292 |
| 2,896,555 A * | 7/1959 | Marcus et al. | 425/292 |
| 3,155,055 A * | 11/1964 | Nishkian | 72/334 |
| 3,232,246 A * | 2/1966 | Nishkian | 425/398 |
| 4,009,857 A * | 3/1977 | Delmas | 249/102 |
| 5,462,757 A * | 10/1995 | Booy et al. | 426/496 |
| 5,622,742 A * | 4/1997 | Carollo | 426/279 |
| 5,635,230 A * | 6/1997 | Aasted | 426/138 |
| 5,643,617 A * | 7/1997 | Burtscher | 425/298 |
| 5,705,217 A * | 1/1998 | Aasted | 426/512 |
| 6,843,167 B1 * | 1/2005 | Kanafani et al. | 99/349 |
| 6,902,754 B1 * | 6/2005 | Evans et al. | 426/503 |
| 7,223,428 B2 * | 5/2007 | Willcocks et al. | 426/383 |
| 7,980,847 B2 * | 7/2011 | Steiner | 425/407 |

* cited by examiner

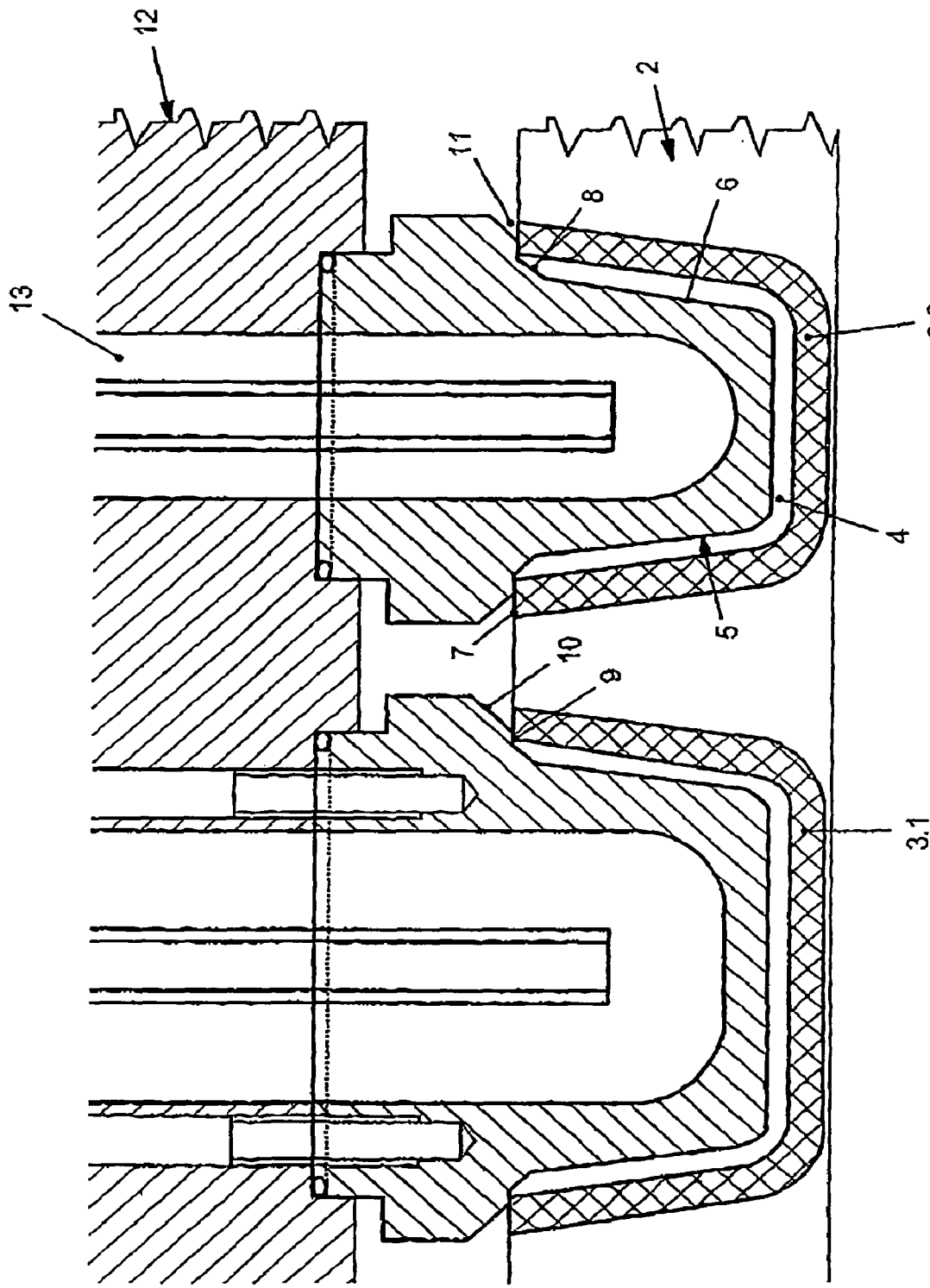

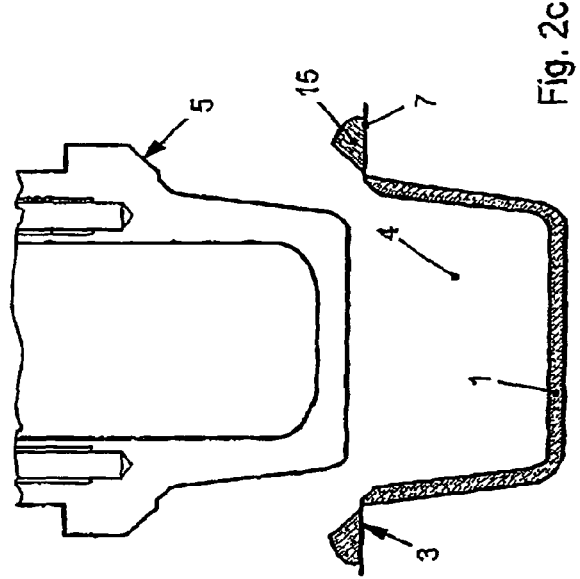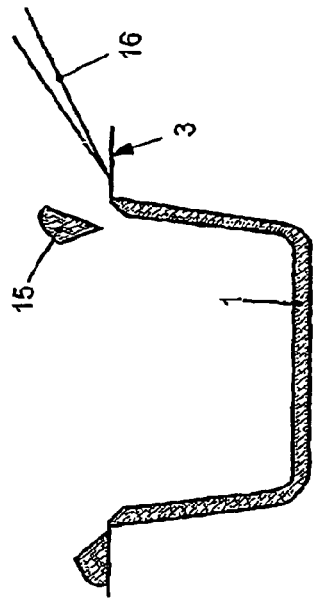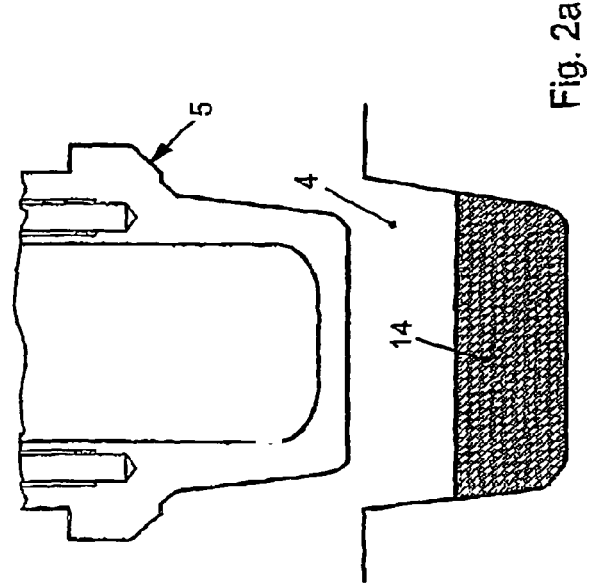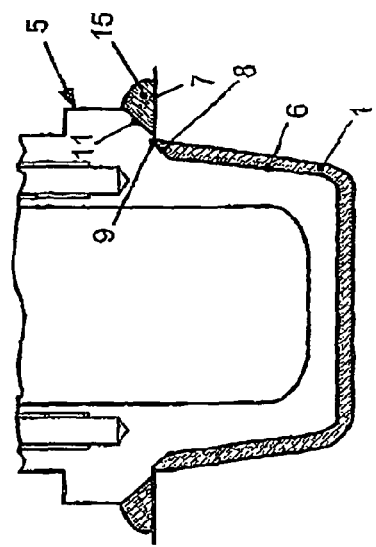

METHOD AND DEVICE FOR THE PRODUCTION OF EDIBLES COMPRISING AN OUTER SHELL

BACKGROUND OF THE INVENTION

The invention relates to a method for the production of consumables having an outer shell from a mass introduced into a mold into which a thermally controlled die then penetrates, an excess fraction of the mass emerging over a mold edge, and to a device for this purpose.

DE 197 20 544 C1 describes, for example, a method and a device for the production of consumables having a outer shell which is produced by extrusion by means of a thermally controlled die penetrating into a mold, the dew point of the atmosphere surrounding the consumable being kept below the temperature of the die.

In this method, it is not possible to determine the chocolate mass with an accuracy such that the edge of the confectionary product is flush with the edge of the mold. Furthermore, there is no smooth planar edge formed. As a rule, therefore, somewhat more molding mass is introduced into a recess of the mold and consequently a projecting edge is produced. This projecting edge then has to be removed in turn, in order to obtain a smooth edge of the confectionary product.

The removal of the edge takes place, for example according to EP 0 589 820 B1, in that a knife scraps along the surface of the mold and at the same time impinges onto the projecting edge from the side and peels off this projecting edge. The disadvantage of this method is that, for example when the molding mass is still warm, the upper edge is not peeled off, but, instead, is smeared. If the molding mass is in the meantime too cold, there is the risk that the molding mass breaks in the region of the upper edge and therefore a smooth edge is not produced.

U.S. Pat. No. 1,647,944 again disclosed a method for the production of a confectionery product, in which each die is assigned cutting blades. These cutting blades penetrate into the projecting edge even during the production of the confectionary product. When the confectionary product is cooled, the die is rotated together with the blades, the latter cutting off the upper edge.

The object of the present invention is to provide a method and a device of the above-mentioned type, by means of which the separation of the excess mass from the actual shell takes place in a simple, but clean manner, so that an absolutely smooth shell edge is produced.

SUMMARY OF THE INVENTION

The foregoing object is achieved, wherein the excess mass at the mold edge is separated from the shell by means of a die.

Thus, when the die is lowered into the mold space, the excess mass is pressed beyond the mold edge and this excess mass is separated from the actual shell. In the last stage of the lowering of the die, there is therefore also, at the same time, some additional pressing onto the chocolate mass which forms the shell in the mold space. This ensures that the chocolate mass is matched as closely as possible to the die surface even in all the cants and corners, so that an absolutely smooth shell surface and shell inner face are produced.

The excess mass is already separated from the shell so that it can then be removed in any desired way, without damage to the shell. Preferably, a corresponding tool, such as, for example, a scraper or a knife, is used in order to separate this excess mass from the mold edge. In this case, the knife may also be used for chocolate masses which differ in their color and composition, since this knife comes into contact only with the excess mass, not with the actual shell.

Other possibilities for removing the excess mass may, however, also be envisaged. For example, the mold may be twisted, so that the excess mass jumps off from the mold. Vibration is also conceivable. All such possibilities are to be covered by the idea in the invention.

According to one exemplary embodiment of the method, the excess mass is to be pinched off from the shell, that is to say that edge of the die which impinges onto the mold edge has a sheetlike design. In this case, even an edge of 0.5 mm to 1 mm is sufficient. The thinner the edge is, the better. The edge may even have a cutter shape similar to a knife-edged ring, so that excess mass is not pinched off, but cut off.

In a further exemplary embodiment of the invention, the die is to form, with the mold edge, an opening space for receiving the excess mass. For this purpose, an oblique face opening away from the mold edge is provided on the die. This ensures that the excess mass does not flow too far over the mold and form too large an area of adhesion with the mold. If the excess mass is arranged as a thick bead in the opening space, the area of adhesion with the mold is small, so that it becomes easier for this excess mass to be knocked off.

Furthermore, the edge of the die has adjoining it, toward the mold interior, an oblique face which merges into a die face shaping the shell. Preferably, this oblique face is in an angular position of about 45°. It also transfers this obliquity to the edge region of the shell, so as to form here a relative large bearing face for a lid which is applied to the shell at a later time after a mass has been introduced into the shell.

What geometric configuration the mold or the mold space and the die have is of minor importance. All geometric configurations are to be covered by the idea of the invention.

Furthermore, the mold may be a multiple mold or else an individual mold or a double mold, for example for the production of chocolate eggs which are composed of two shell halves.

BRIEF DESCRIPTION OF THE DRAWINGS

Further advantages, features and details of the invention may be gathered from the following description of preferred exemplary embodiments and from the drawing in which:

FIG. 1 shows a partially illustrated cross section through a device according to the invention for the production of chocolate shells;

FIGS. 2a) to d) show various method steps in the production of chocolate shells, with parts of the device according to FIG. 1;

DETAILED DESCRIPTION

Figure 3:
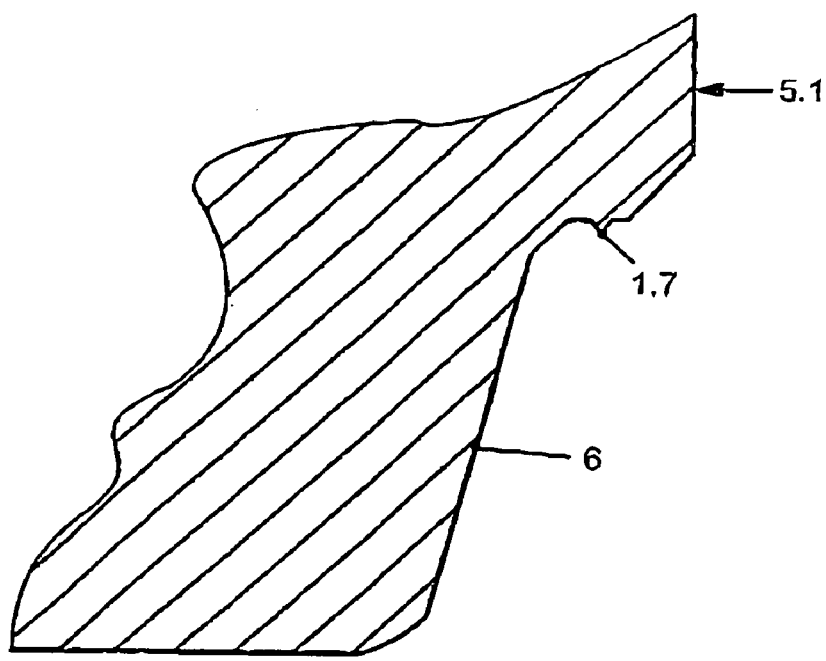
FIG. 3 shows an enlarged partial cross section through a further exemplary embodiment of die according to the invention.

FIG. 1 shows, from a device for the production of chocolate shells 1 (see FIG. 2), a multiple mold 2 in which two molds 3.1 and 3.2 lie next to one another. These molds 3.1 and 3.2 form mold spaces 4 for receiving a chocolate mass. The thermally controlled die 5 penetrates into the mold space 4, said die possessing a die face 6 which has adjoining it, toward a mold edge 7, an oblique face 8 which merges into an edge 9. In the position of use shown in FIG. 1, in which the chocolate shell 1 is shaped, the edge 9 lies on the mold edge 7.

The edge 9 has adjoining it a further oblique face 10 which, together with the mold edge 7, forms an opening space 11.

The die 5 is located, together with further dies, on a carrier plate 12. Ducts 13 for the routing of a cooling medium are located in the carrier plate 12 and, if appropriate, also in the die 5.

The functioning of the present invention is explained in more detail by means of FIG. 2:

In method step a), chocolate mass 14 is already introduced in the mold space 4, and the die 5 is located above this mold space 4.

In method step b), the die 5 is lowered, the die face 6 and the also the oblique face 8 entering the mold space 4. At the same time, excess mass 15 is pressed out of the mold space 4 and passes onto the mold edge 7. In the last stage of the lowering of the die 5, the edge 9 impinges onto the mold edge 7 and pinches the excess mass 15 off from the chocolate shell 1. This excess mass 15 lies in the space 11 which is formed by the oblique face 10 and the mold edge 7.

In a method step c), the die 5 is raised again. Since the chocolate shell 1 has already become dimensionally stable due to contact with the thermally controlled die 5, it remains in this form in the mold space 4. The excess mass 15 likewise remains on the mold edge 7, the entire mold 3 then preferably being cooled further.

In method step d), the excess mass 15 is scraped off from the mold 3 by means of any desired tool 16. The tool 16 may be a scraper, spatula, knife or the like. In many instances, it may even be sufficient if the mold 3 is vibrated or twisted.

The chocolate shell 1 is, for example, taken or shaken out of the mold space 4 by means of the rotation of the mold 3. As a rule, the interior of the shell is filled with a further mass when the shell closed by means of a lid. The lid bears against the oblique face 8, good adhesion being achieved here, since the lid likewise bears over a large area against the shell 1 as a result of the oblique face.

It can be seen in FIG. 3 that one edge of a die 5.1 is designed as a cutter 17. If the die is, for example, round, this cutter 17 forms a knife-edged ring. As a result, the excess mass 15 is not pinched off, but, instead, separated. Separation preferably takes place exactly at the transitional cant between the mold edge 7 and the mold space 4.

Figure 4:
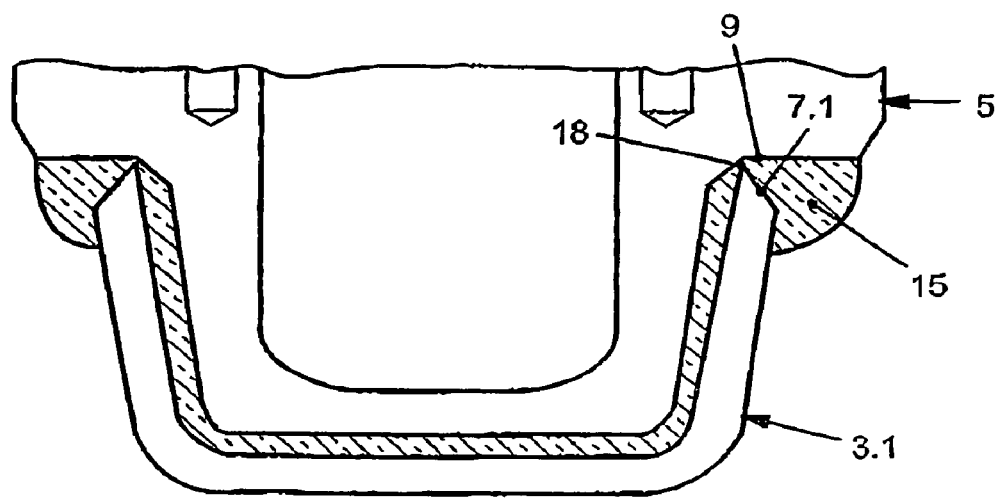
FIG. 4 shows a cross section through part of the device according to FIG. 1 with an individual mold.

For example, in order to produce chocolate eggs, individual molds 3.1, such as are illustrated in FIG. 4, are also used. These individual molds 3.1 are connected to one another via lattice bars. On these individual molds 3.1, a mold edge 7.1 is arranged, which edge has an oblique configuration and, toward the mold space 4, forms a sharp cant 18. When the edge 9 impinges onto the sharp cant 18, the excess mass 15 is virtually cut off.

The invention claimed is:

1. A method for making an outer shell of a chocolate material comprising the steps of:
   (a) providing a mold defining a mold space having a moldable chocolate material therein, said mold having a horizontal planar mold edge;
   (b) providing a thermally controlled die having a circumferential outer edge having a width of between 0.5 to 1 mm;
   (c) introducing the thermally controlled die into the mold space a first distance for shaping the chocolate material into an outer shell, wherein excess chocolate material is squeezed from the mold space onto the horizontal planar mold edge;
   (d) further introducing the die into the mold space to a second distance, wherein the circumferential outer edge of the die contacts the horizontal planar mold edge after the penetration of the die into the mold space to the second distance to separate the excess chocolate material on the horizontal planar mold edge from the outer shell; and
   (e) horizontally scraping off the separated excess chocolate material from the horizontal planar mold edge without contacting and damaging the outer shell.

2. A method for making an outer shell of a chocolate material comprising the steps of:
   (a) providing a mold defining a mold space having a moldable chocolate material therein, said mold having a horizontal planar mold edge of a first dimension;
   (b) providing a thermally controlled die having a circumferential outer edge width of a second dimension wherein the second dimension is substantially smaller than the first dimension;
   (c) introducing the thermally controlled die into the mold space a first distance for shaping the chocolate material into an outer shell, wherein excess chocolate material is squeezed from the mold space onto the horizontal planar mold edge;
   (d) further introducing the die into the mold space to a second distance, wherein the circumferential outer edge of the die contacts the horizontal planar mold edge after the penetration of the die into the mold space to the second distance to separate the excess chocolate material on the horizontal planar mold edge from the outer shell; and
   (e) horizontally scraping off the separated excess chocolate material from the horizontal planar mold edge without contacting and damaging the outer shell.

3. The method as claimed in claim 1 or 2, wherein the excess chocolate material is pinched off from the outer shell.

4. The method as claimed in claim 1 or 2, wherein the excess chocolate material is cut off from the outer shell.

5. The device as claimed in claim 1 or 2, wherein the circumferential outer edge has a knife-edged ring.

* * * * *